US012537315B2

(12) United States Patent
Wu et al.

(10) Patent No.: US 12,537,315 B2
(45) Date of Patent: Jan. 27, 2026

(54) ANTENNA STRUCTURE

(71) Applicant: Wistron NeWeb Corp., Hsinchu (TW)

(72) Inventors: Chin-Hsien Wu, Hsinchu (TW); Tsun-Che Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 249 days.

(21) Appl. No.: 18/449,038

(22) Filed: Aug. 14, 2023

(65) Prior Publication Data

US 2024/0097347 A1 Mar. 21, 2024

(30) Foreign Application Priority Data

Sep. 15, 2022 (TW) ................................. 111134852

(51) Int. Cl.
*H01Q 21/06* (2006.01)
*H01Q 1/48* (2006.01)
*H01Q 21/00* (2006.01)

(52) U.S. Cl.
CPC ............. *H01Q 21/064* (2013.01); *H01Q 1/48* (2013.01); *H01Q 21/005* (2013.01)

(58) Field of Classification Search
CPC ...... H01Q 1/48; H01Q 9/028; H01Q 21/0043; H01Q 21/005; H01Q 21/064
See application file for complete search history.

(56) References Cited

U.S. PATENT DOCUMENTS 3,696,433 A * 10/1972 Killion .................. H01Q 13/22 333/237
8,610,633 B2 12/2013 Chen et al.
9,653,819 B1 * 5/2017 Izadian .............. H01Q 21/0087
10,394,204 B1 8/2019 Izadian
2012/0038530 A1 * 2/2012 Chen ................... H01Q 21/005 343/771
2024/0235038 A9 * 7/2024 Garcia Tejero ...... H01Q 21/064

FOREIGN PATENT DOCUMENTS

TW 201214868 A 4/2012

* cited by examiner

*Primary Examiner* — Raymond R Chai
(74) *Attorney, Agent, or Firm* — McClure, Qualey & Rodack, LLP

(57) ABSTRACT

An antenna structure includes an input waveguide, a first output waveguide, and a second output waveguide. The first output waveguide is connected through a first Z-shaped slot to the input waveguide. The second output waveguide is adjacent to the first output waveguide. The second output waveguide is connected through a second Z-shaped slot to the input waveguide.

20 Claims, 10 Drawing Sheets

400

ANTENNA STRUCTURE

CROSS REFERENCE TO RELATED APPLICATIONS

This application claims priority of Taiwan Patent Application No. 111134852 filed on Sep. 15, 2022, the entirety of which is incorporated by reference herein.

BACKGROUND OF THE INVENTION

Field of the Invention

The disclosure generally relates to an antenna structure, and more particularly, to an antenna structure with high cross-polarization isolation.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient cross-polarization isolation, it may degrade the communication quality of the relative device. Accordingly, it has become a critical challenge for antenna designers to design a small-size antenna element with high cross-polarization isolation.

BRIEF SUMMARY OF THE INVENTION

In an exemplary embodiment, the invention is directed to an antenna structure that includes an input waveguide, a first output waveguide, and a second output waveguide. The first output waveguide is connected through a first Z-shaped slot to the input waveguide. The second output waveguide is adjacent to the first output waveguide. The second output waveguide is connected through a second Z-shaped slot to the input waveguide.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
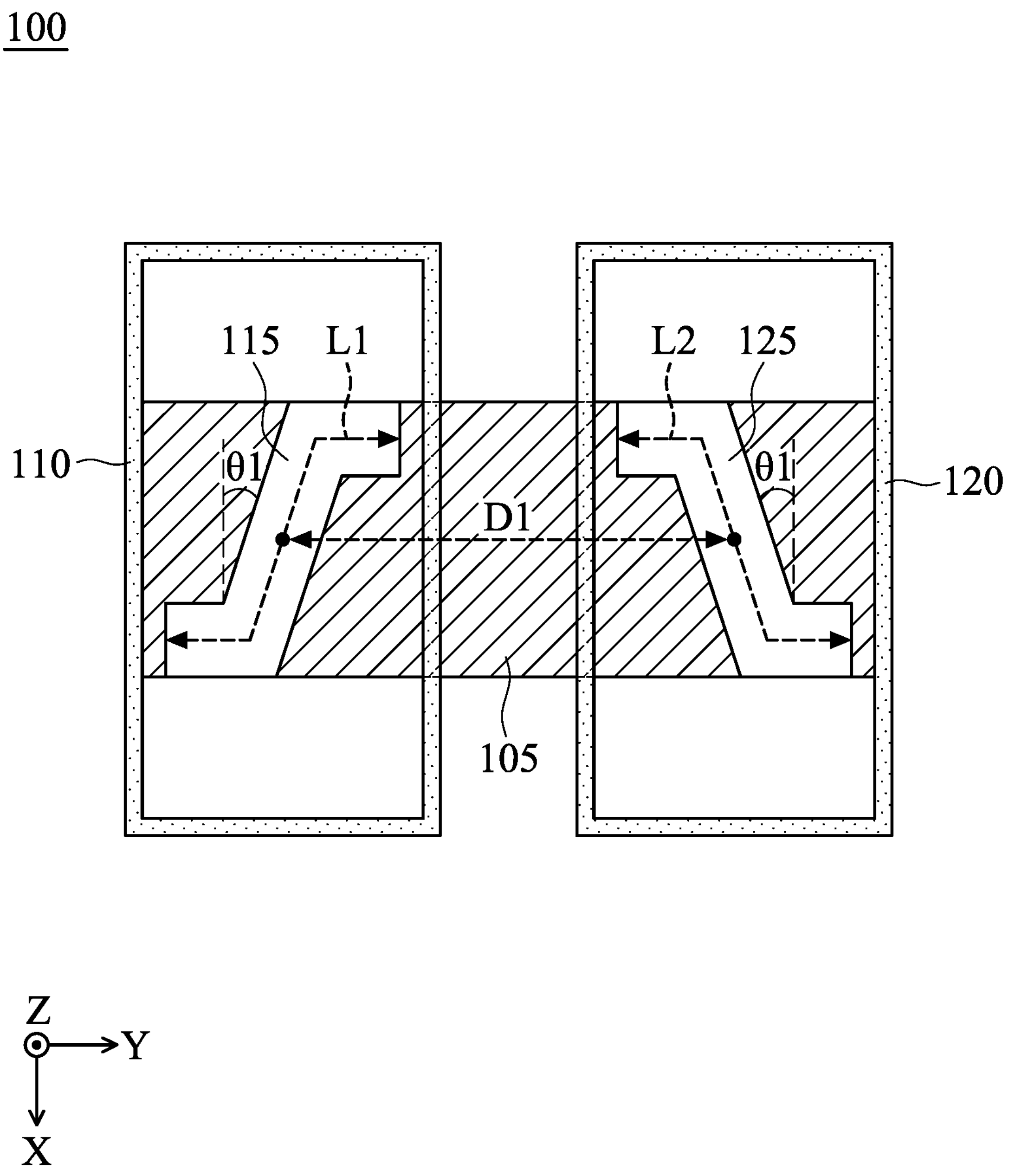
FIG. 1A is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
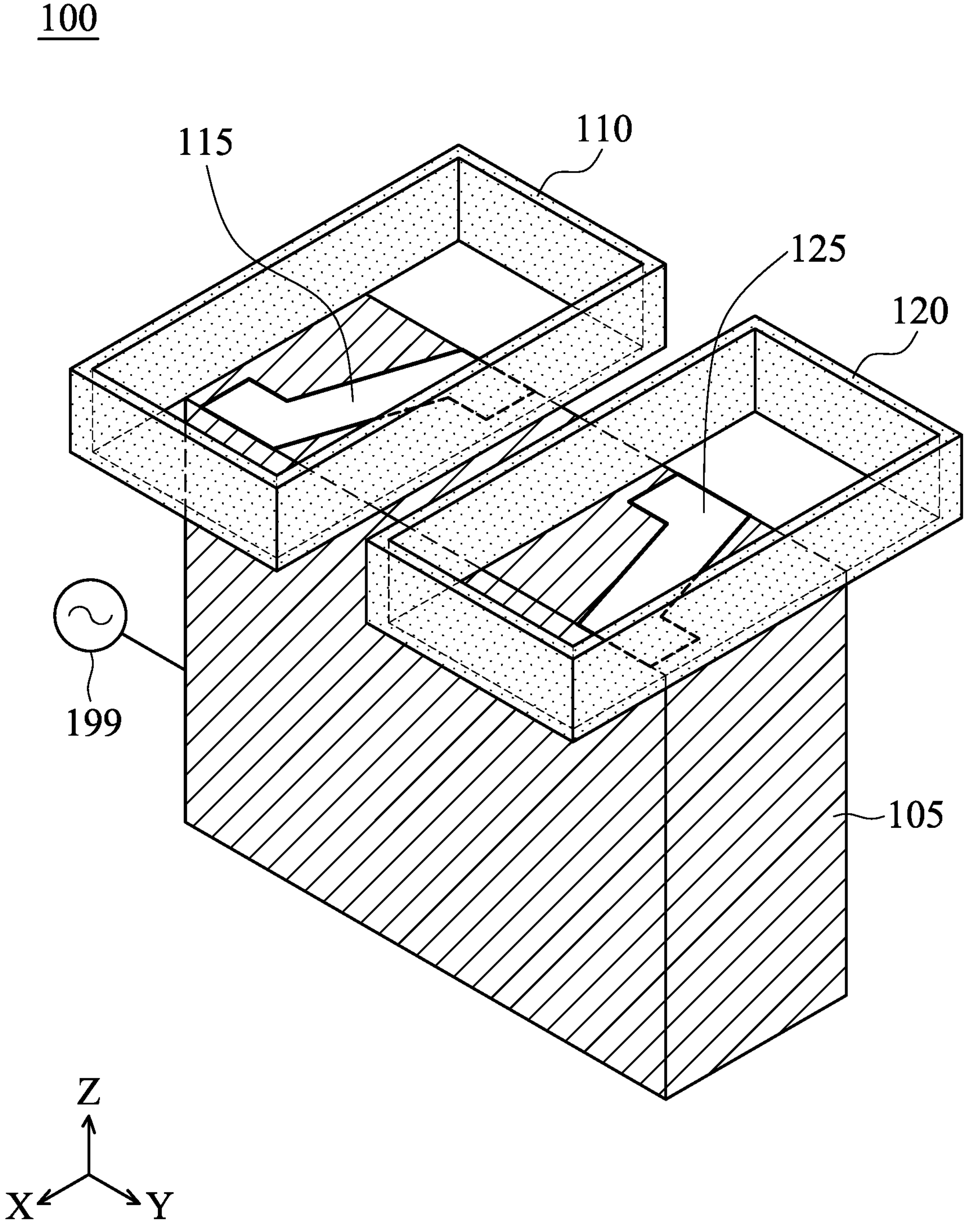
FIG. 1B is a perspective view of the antenna structure according to an embodiment of the invention.

FIG. 1A is a top view of an antenna structure 100 according to an embodiment of the invention. FIG. 1B is a perspective view of the antenna structure 100 according to an embodiment of the invention. Please refer to FIG. 1A and FIG. 1B together. The antenna structure 100 may be applied to a vehicle radar device or a mobile device, such as a smart phone, a tablet computer, or a notebook computer. In the embodiment of FIG. 1A and FIG. 1B, the antenna structure 100 at least includes an input waveguide 105, a first output waveguide 110, and a second output waveguide 120. The input waveguide 105, and the first output waveguide 110, and the second output waveguide 120 may all be made of metal materials, such as copper, silver, aluminum, iron, or their alloys.

The shapes and types of the input waveguide 105, and the first output waveguide 110, and the second output waveguide 120 are not limited in the invention. The input waveguide 105 may be coupled to a signal source 199. For example, the signal source 199 may be an RF (Radio Frequency) module for exciting the antenna structure 100. In some embodiments, electromagnetic waves in the input waveguide 105 operate in a $TE_{10}$ mode, but they are not limited thereto. In addition, the first output waveguide 110 and the second output waveguide 120 may be stacked up on the input waveguide 105.

The first output waveguide 110 is connected through a first Z-shaped slot 115 to the input waveguide 105. Thus, the feeding electromagnetic energy of the signal source 199 is transmitted from the input waveguide 105 to the first output waveguide 110, and then the feeding electromagnetic energy is radiated outwardly (e.g., along the +Z-axis). For example, the first Z-shaped slot 115 may be formed on the input waveguide 105, the first output waveguide 110, or the combination thereof (e.g., both the input waveguide 105 and the first output waveguide 110).

The second output waveguide 120 is adjacent to the first output waveguide 110. The second output waveguide 120 is connected through a second Z-shaped slot 125 to the input waveguide 105. Thus, the feeding electromagnetic energy of the signal source 199 is transmitted from the input waveguide 105 to the second output waveguide 120, and then the feeding electromagnetic energy is radiated outwardly (e.g., in the direction of the +Z-axis). For example, the second Z-shaped slot 125 may be formed on the input waveguide 105, the second output waveguide 120, or the combination thereof (e.g., both the input waveguide 105 and the second output waveguide 120). In some embodiments, the second Z-shaped slot 125 is symmetrical to the first Z-shaped slot 115. That is, the second Z-shaped slot 125 is considered as a mirror image of the first Z-shaped slot 115. In some embodiments, each of the first Z-shaped slot 115 and the second Z-shaped slot 125 has a first tilt angle θ1. The first tilt angle θ1 may be from 0 to 90 degrees. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

Figure 2:
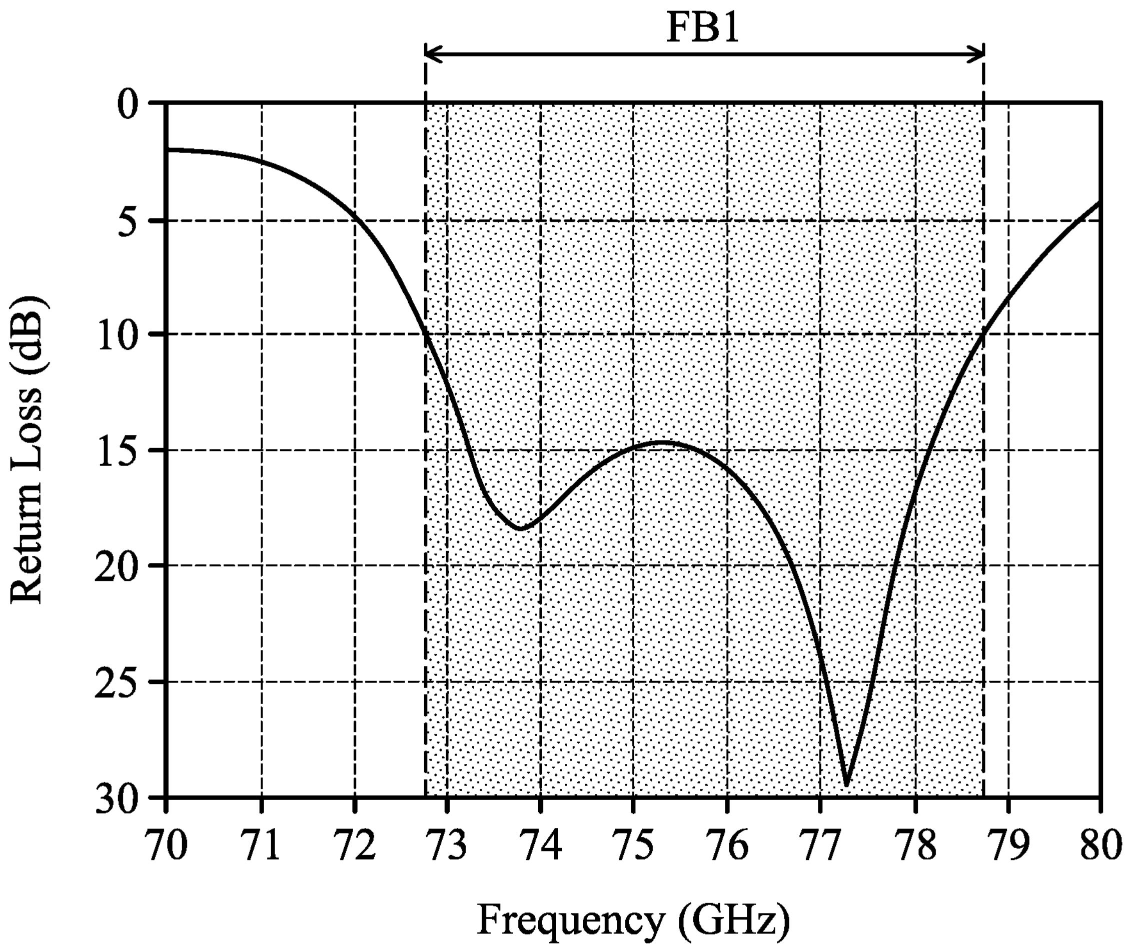
FIG. 2 is a diagram of return loss of an antenna structure according to an embodiment of the invention.

FIG. 2 is a diagram of return loss of the antenna structure 100 according to an embodiment of the invention. The horizontal axis represents the operational frequency (MHz), and the vertical axis represents the return loss (dB). According to the measurement of FIG. 2, the antenna structure 100 can cover at least one operational frequency band FB1. For example, the operational frequency band FB1 may be from 73 GHz to 78 GHz. Therefore, the antenna structure 100 can support at least the wideband operations of communications of vehicle radar and mmWave (Millimeter Wave). Furthermore, the cross-polarization isolation of the antenna structure 100 is relatively high within the aforementioned operational frequency band FB1, and it can meet the requirements of practical applications of general communication devices.

In some embodiments, the element sizes of the antenna structure 100 will be described as follows. The length L1 of the first Z-shaped slot 115 may be substantially equal to 0.5 wavelength (λ/2) of the operational frequency band FB1 of the antenna structure 100. The length L2 of the second Z-shaped slot 125 may also be substantially equal to 0.5 wavelength (λ/2) of the operational frequency band FB1 of the antenna structure 100. The center-to-center distance D1 between the first output waveguide 110 and the second output waveguide 120 may be substantially equal to 0.5 wavelength (λ/2) of the operational frequency band FB1 of the antenna structure 100. The above ranges of element sizes are calculated and obtained according to many experiment results, and they help to optimize the operational bandwidth and impedance matching of the antenna structure 100. It should be understood that the above terms "wavelength" over the disclosure means the wavelength (λ) in free space. When a dielectric material is used (e.g., a dielectric substrate), the wavelength (λ) can be adjusted to an "effective wavelength (λg)" according to the effective dielectric constant between the dielectric material and the free space. Conversely, if no dielectric material is used, the effective wavelength (λg) will be the same as the free-space wavelength (λ).

The following embodiments will introduce different configurations and detail structural features of the antenna structure 100. It should be understood these figures and descriptions are merely exemplary, rather than limitations of the invention.

Figure 3:
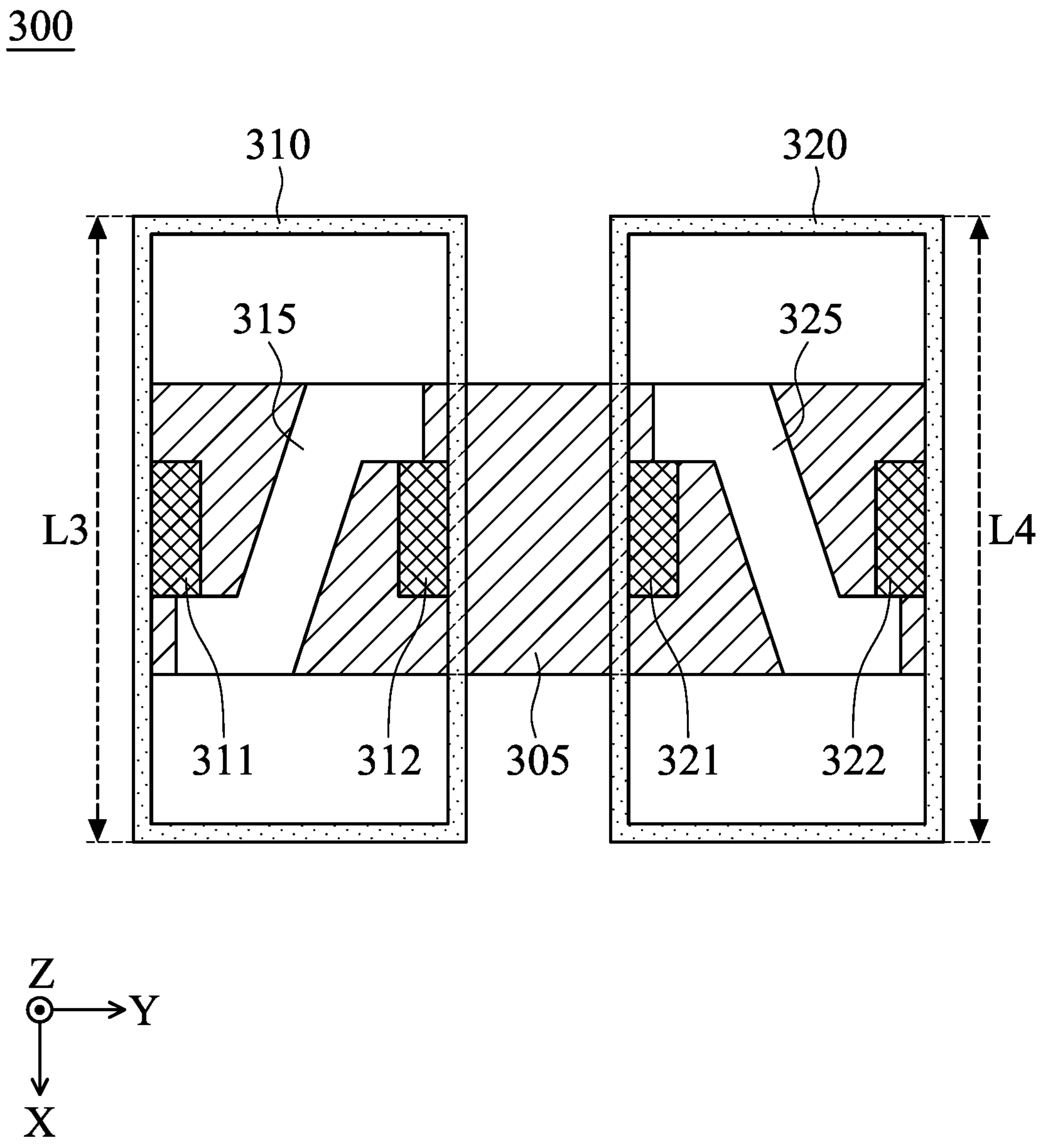
FIG. 3 is a top view of an antenna structure according to an embodiment of the invention.

FIG. 3 is a top view of an antenna structure 300 according to an embodiment of the invention. FIG. 3 is similar to FIG. 1A. In the embodiment of FIG. 3, the antenna structure 300 includes an input waveguide 305, a first output waveguide 310, and a second output waveguide 320. The first output waveguide 310 is connected through a first Z-shaped slot 315 to the input waveguide 305. The second output waveguide 320 is connected through a second Z-shaped slot 325 to the input waveguide 305. It should be noted that the first output waveguide 310 further includes a first protruding portion 311 and a second protruding portion 312, which are opposite to each other and are formed on the inner surfaces of the first output waveguide 310. The first Z-shaped slot 315 may be positioned between the first protruding portion 311 and the second protruding portion 312 of the first output waveguide 310. Furthermore, the second output waveguide 320 further includes a third protruding portion 321 and a fourth protruding portion 322, which are opposite to each other and are formed on the inner surfaces of the second output waveguide 320. The second Z-shaped slot 325 may be positioned between the third protruding portion 321 and the fourth protruding portion 322 of the second output waveguide 320. In some embodiments, the heights of the first protruding portion 311, the second protruding portion 312, the third protruding portion 321, and the fourth protruding portion 322 are the same as the heights of the first output waveguide 310 and the second output waveguide 320. According to practical measurements, the first protruding portion 311, the second protruding portion 312, the third protruding portion 321, and the fourth protruding portion 322 are configured to fine-tune the impedance matching of the antenna structure 300. They help to reduce the length L3 of the first output waveguide 310 and the length L4 of the second output waveguide 320 by at least 20%, thereby minimizing the whole structure size. Other features of the antenna structure 300 of FIG. 3 are similar to those of the antenna structure 100 of FIG. 1A and FIG. 1B. Therefore, the two embodiments can achieve similar levels of performance.

Figure 4:
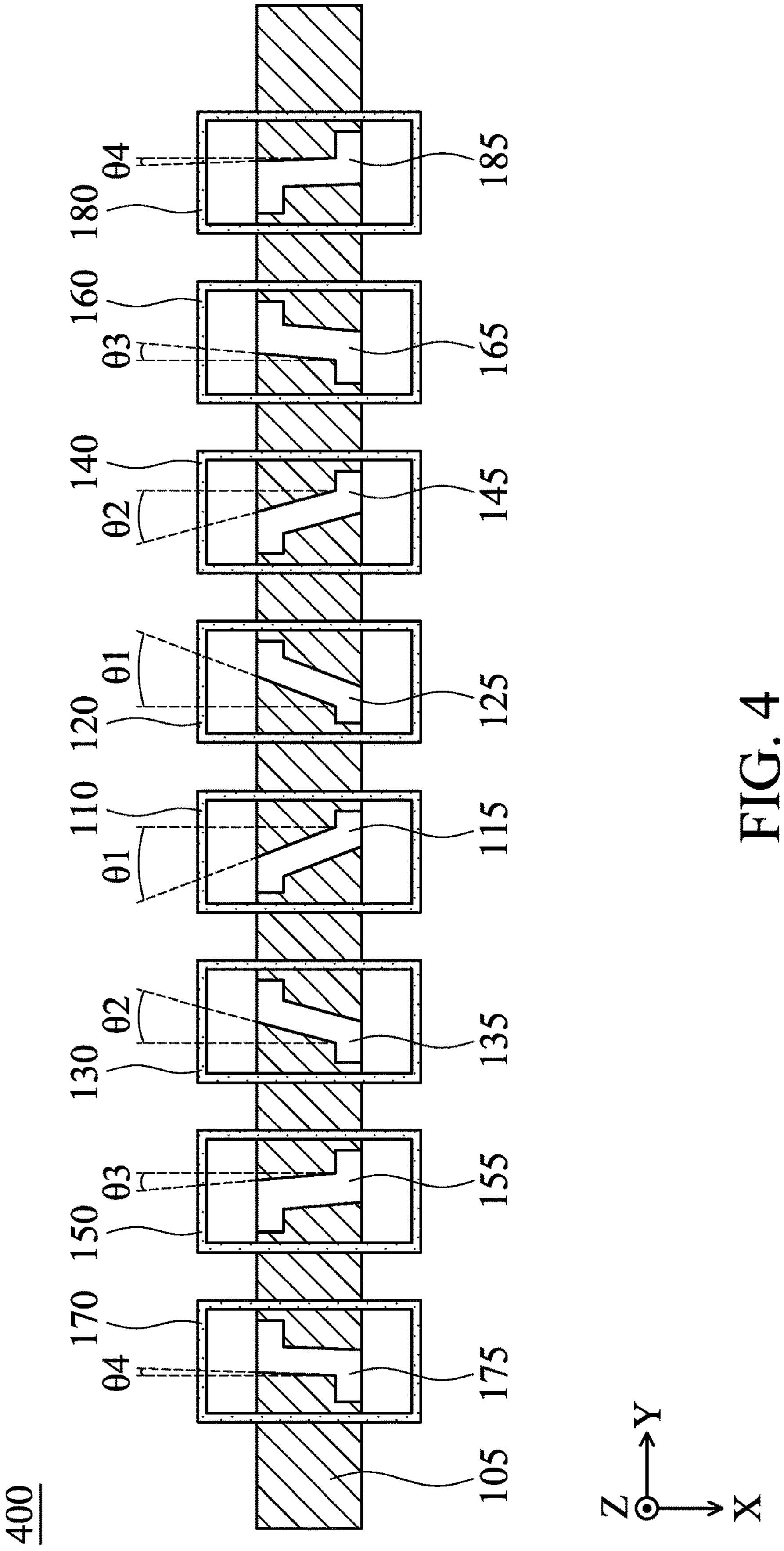
FIG. 4 is a top view of an antenna structure according to an embodiment of the invention.

FIG. 4 is a top view of an antenna structure 400 according to an embodiment of the invention. FIG. 4 is similar to FIG. 1A. In the embodiment of FIG. 4, besides the input waveguide 105, the first output waveguide 110, and a second output waveguide 120, the antenna structure 400 further includes a third output waveguide 130, a fourth output waveguide 140, a fifth output waveguide 150, a sixth output waveguide 160, a seventh output waveguide 170, and an eighth output waveguide 180. It should be understood that the total number of output waveguides are adjustable according to different requirements.

The third output waveguide 130 is adjacent to the first output waveguide 110. The third output waveguide 130 is connected through a third Z-shaped slot 135 to the input waveguide 105. For example, the third Z-shaped slot 135 may be formed on the input waveguide 105, the third output waveguide 130, or the combination thereof (e.g., both the input waveguide 105 and the third output waveguide 130). The fourth output waveguide 140 is adjacent to the second output waveguide 120. The fourth output waveguide 140 is connected through a fourth Z-shaped slot 145 to the input waveguide 105. For example, the fourth Z-shaped slot 145 may be formed on the input waveguide 105, the fourth output waveguide 140, or the combination thereof (e.g., both the input waveguide 105 and the fourth output waveguide 140). The fourth Z-shaped slot 145 is symmetrical to the third Z-shaped slot 135. In some embodiments, each of the third Z-shaped slot 135 and the fourth Z-shaped slot 145 has a second tilt angle θ2. The second tilt angle θ2 may be smaller than the first tilt angle θ1.

The fifth output waveguide 150 is adjacent to the third output waveguide 130. The fifth output waveguide 150 is connected through a fifth Z-shaped slot 155 to the input waveguide 105. For example, the fifth Z-shaped slot 155 may be formed on the input waveguide 105, the fifth output waveguide 150, or the combination thereof (e.g., both the input waveguide 105 and the fifth output waveguide 150). The sixth output waveguide 160 is adjacent to the fourth output waveguide 140. The sixth output waveguide 160 is connected through a sixth Z-shaped slot 165 to the input waveguide 105. For example, the sixth Z-shaped slot 165 may be formed on the input waveguide 105, the sixth output waveguide 160, or the combination thereof (e.g., both the input waveguide 105 and the sixth output waveguide 160). The sixth Z-shaped slot 165 is symmetrical to the fifth Z-shaped slot 155. In some embodiments, each of the fifth Z-shaped slot 155 and the sixth Z-shaped slot 165 has a third tilt angle θ3. The third tilt angle θ3 may be smaller than the second tilt angle θ2.

The seventh output waveguide 170 is adjacent to the fifth output waveguide 150. The seventh output waveguide 170 is connected through a seventh Z-shaped slot 175 to the input waveguide 105. For example, the seventh Z-shaped slot 175 may be formed on the input waveguide 105, the seventh output waveguide 170, or the combination thereof (e.g., both the input waveguide 105 and the seventh output waveguide 170). The eighth output waveguide 180 is adjacent to the sixth output waveguide 160. The eighth output waveguide 180 is connected through an eighth Z-shaped slot 185 to the input waveguide 105. For example, the eighth Z-shaped slot 185 may be formed on the input waveguide 105, the eighth output waveguide 180, or the combination thereof (e.g., both the input waveguide 105 and the eighth output waveguide 180). The eighth Z-shaped slot 185 is symmetrical to the seventh Z-shaped slot 175. In some embodiments, each of the seventh Z-shaped slot 175 and the eighth Z-shaped slot 185 has a fourth tilt angle θ4. The fourth tilt angle θ4 may be smaller than the third tilt angle θ3.

In some embodiments, the first tilt angle θ1 is substantially equal to 20.8 degrees, the second tilt angle θ2 is substantially equal to 15.3 degrees, the third tilt angle θ3 is substantially equal to 5.8 degrees, and the fourth tilt angle θ4 is substantially equal to 1.5 degrees. For example, all of the above angles may be designed according to the Chebyshev Distribution, but they are not limited thereto. Other features of the antenna structure 400 of FIG. 4 are similar to those of the antenna structure 100 of FIG. 1A and FIG. 1B. Therefore, the two embodiments can achieve similar levels of performance.

Figure 5A:
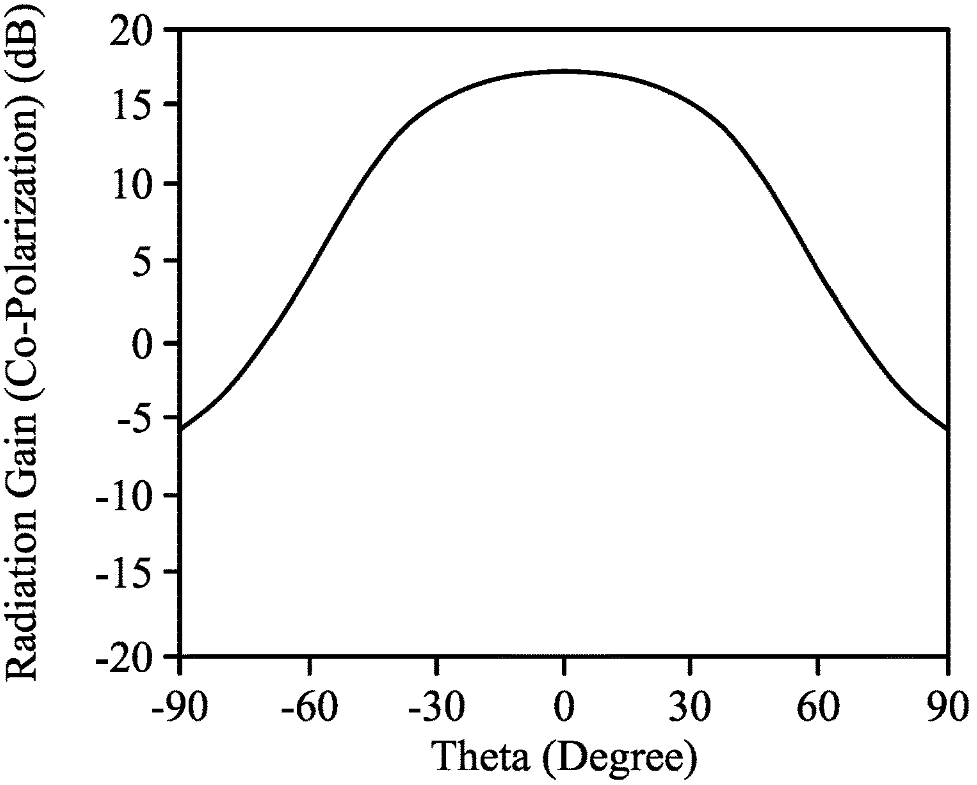
FIG. 5A is a diagram of radiation gain of co-polarization of an antenna structure according to an embodiment of the invention.
Figure 5B:
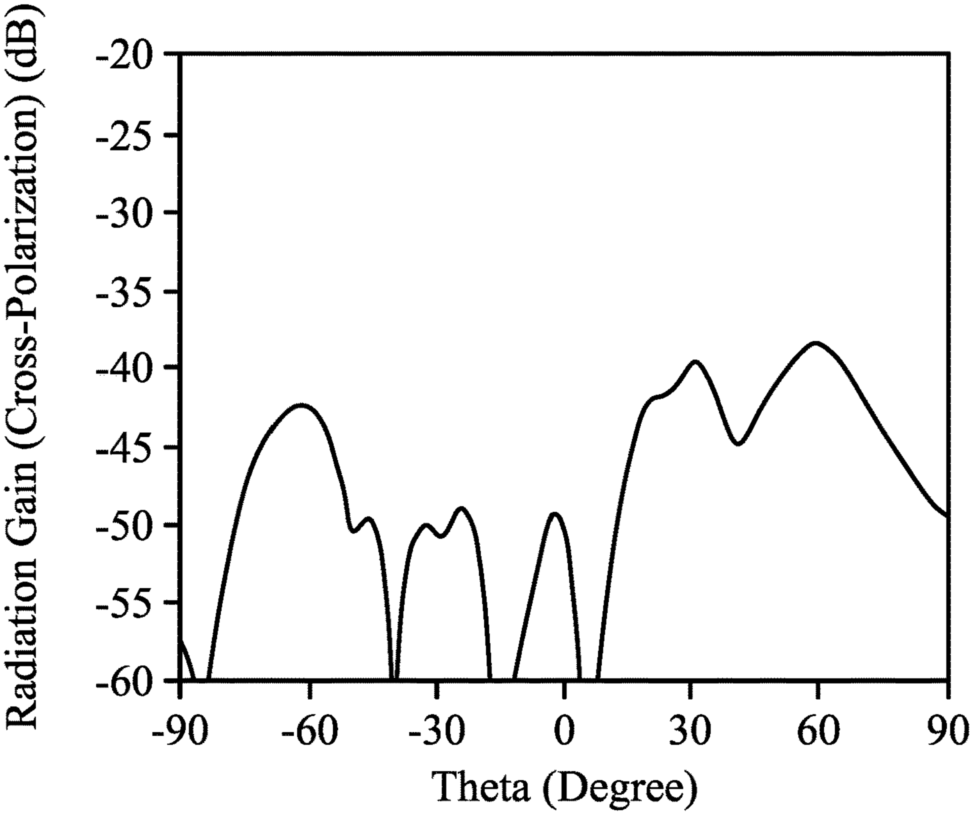
FIG. 5B is a diagram of radiation gain of cross-polarization of an antenna structure according to an embodiment of the invention.

FIG. 5A is a diagram of radiation gain of co-polarization of the antenna structure 400 according to an embodiment of the invention. FIG. 5B is a diagram of radiation gain of cross-polarization of the antenna structure 400 according to an embodiment of the invention. According to the measurements of FIG. 5A and FIG. 5B, the cross-polarization isolation of the antenna structure 400 can reach at least 65 dB. It should be understood that the cross-polarization isolation of the antenna structure 400 can be further enhanced if more output waveguides and more corresponding Z-shaped slots are used.

Figure 6A:
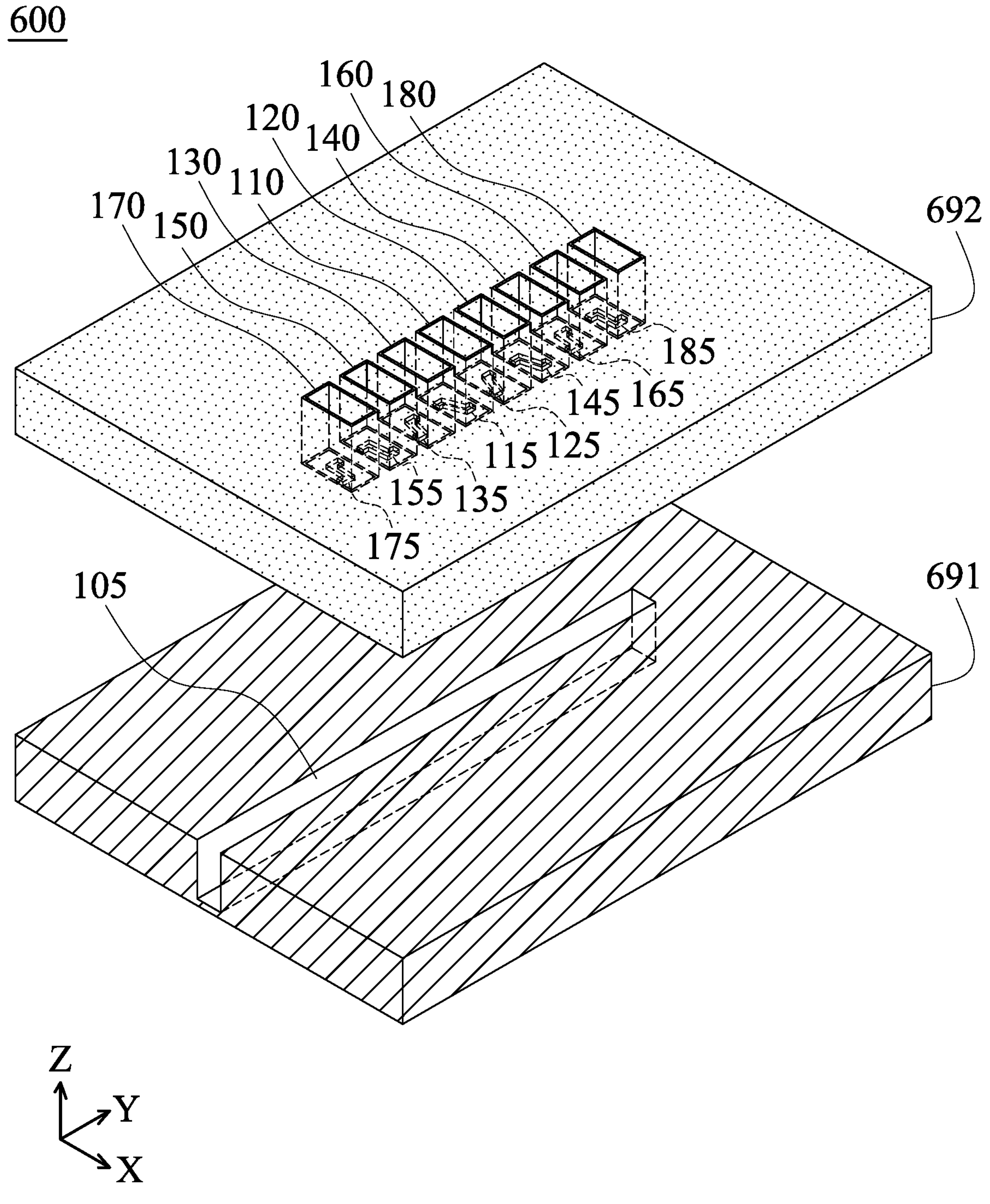
FIG. 6A is an exploded view of an antenna structure according to an embodiment of the invention.
Figure 6B:
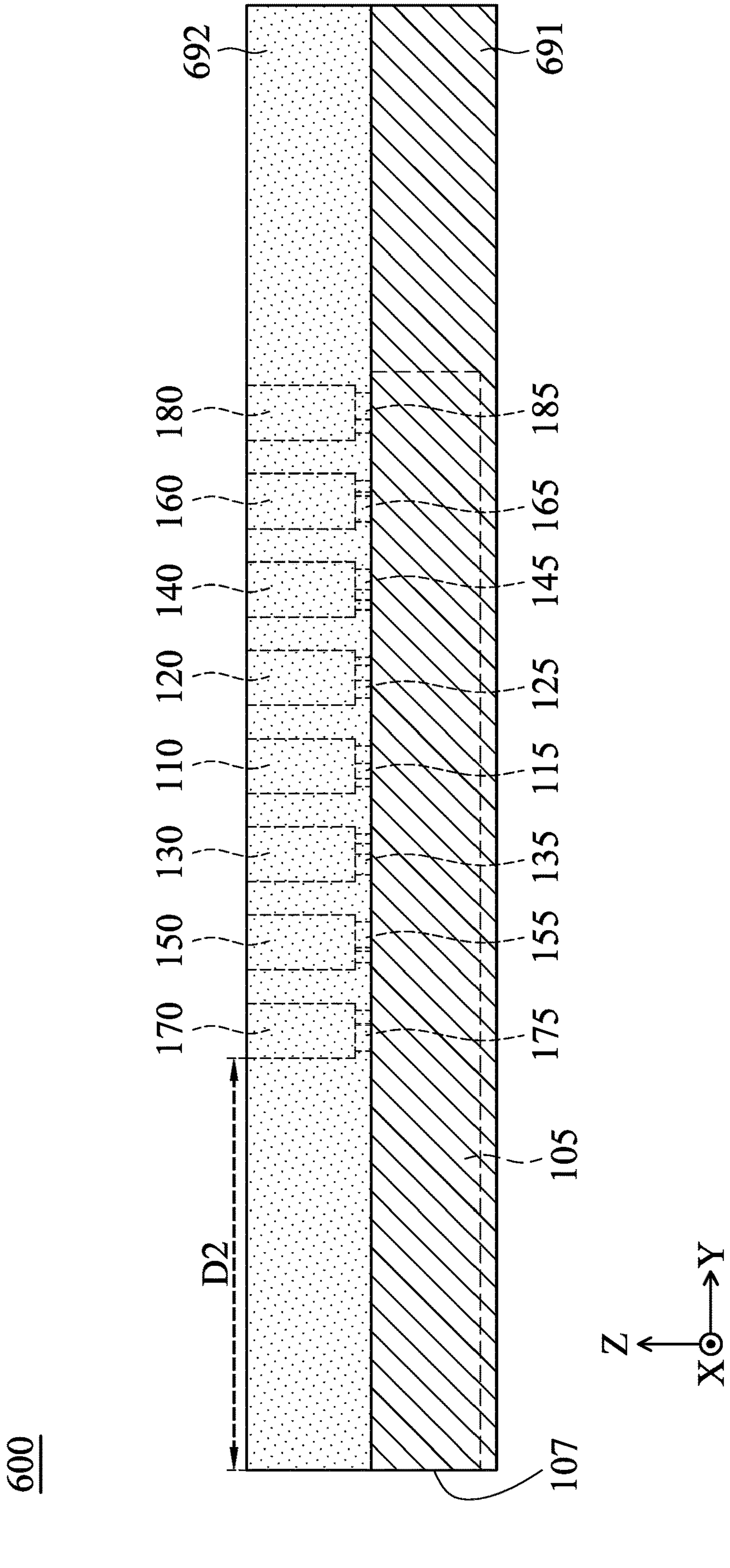
FIG. 6B is a side view of an antenna structure according to an embodiment of the invention.

FIG. 6A is an exploded view of an antenna structure 600 according to an embodiment of the invention. FIG. 6B is a side view of the antenna structure 600 according to an embodiment of the invention. Please refer to FIG. 6A and FIG. 6B together. FIG. 6A and FIG. 6B are similar to FIG. 4. In the embodiment of FIG. 6A and FIG. 6B, the antenna structure 600 further includes a first metal layer 691 and a second metal layer 692. The input waveguide 105 may be formed in the first metal layer 691. In addition, the second metal layer 692 is attached to the first metal layer 691. The first output waveguide 110, the second output waveguide 120, the third output waveguide 130, the fourth output waveguide 140, the fifth output waveguide 150, the sixth output waveguide 160, the seventh output waveguide 170, and the eighth output waveguide 180 are all formed in the second metal layer 692. At this time, the first Z-shaped slot 115, the second Z-shaped slot 125, the third Z-shaped slot 135, the fourth Z-shaped slot 145, the fifth Z-shaped slot 155, the sixth Z-shaped slot 165, the seventh Z-shaped slot 175, and the eighth Z-shaped slot 185 are all adjacent to an interface between the first metal layer 691 and the second metal layer 692. To improve the whole impedance matching, the distance D2 between an input end 107 of the input waveguide 105 and the seventh output waveguide 170 may be at least 0.5 effective wavelength (λg/2) of the operational frequency band FB1 of the antenna structure 600. Under the $TE_{10}$ mode, the effective wavelength (λg) may be about 5 mm. Other features of the antenna structure 600 of FIG. 6A and FIG. 6B are similar to those of the antenna structure 400 of FIG. 4. Therefore, the two embodiments can achieve similar levels of performance.

Figure 7A:
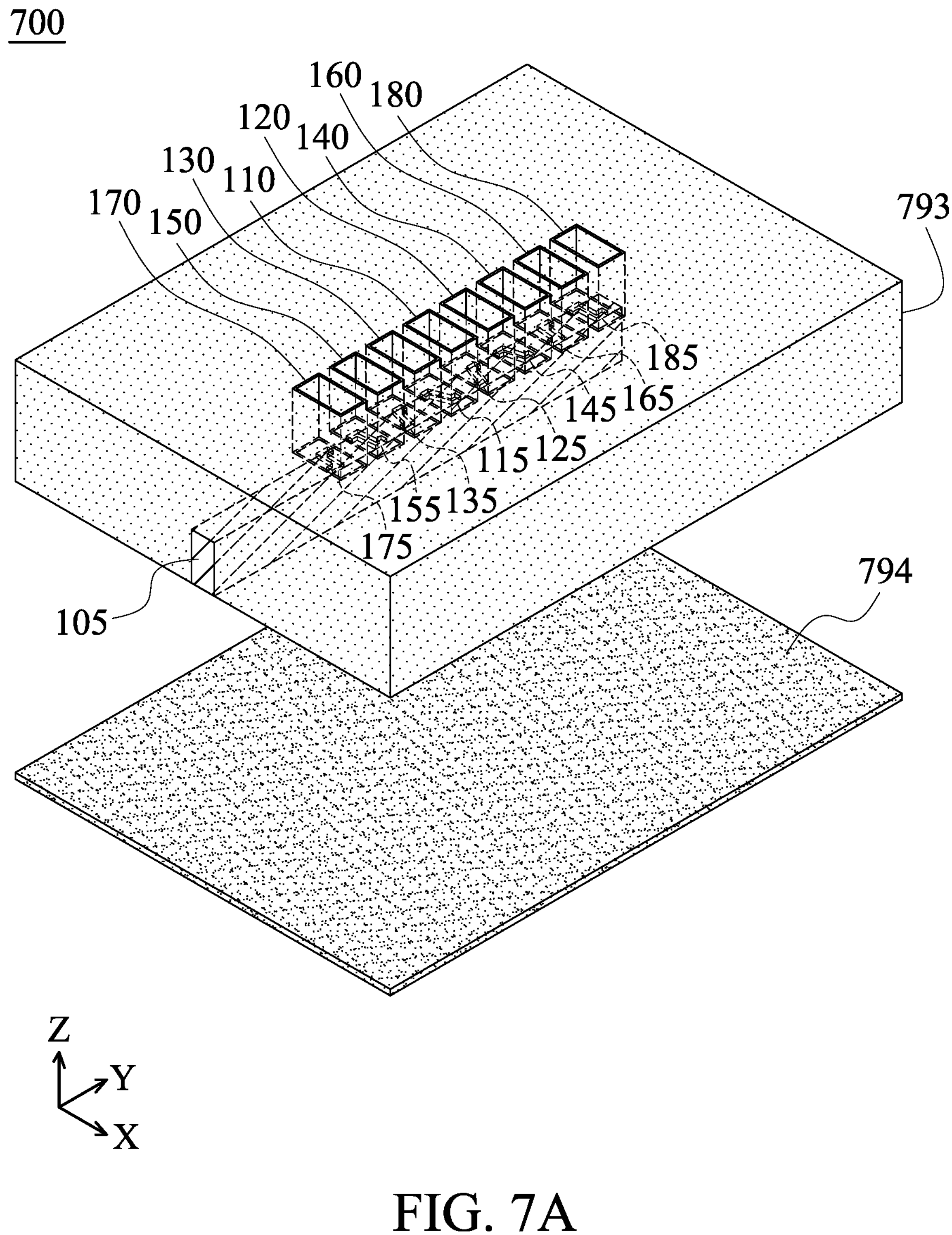
FIG. 7A is an exploded view of an antenna structure according to an embodiment of the invention.
Figure 7B:
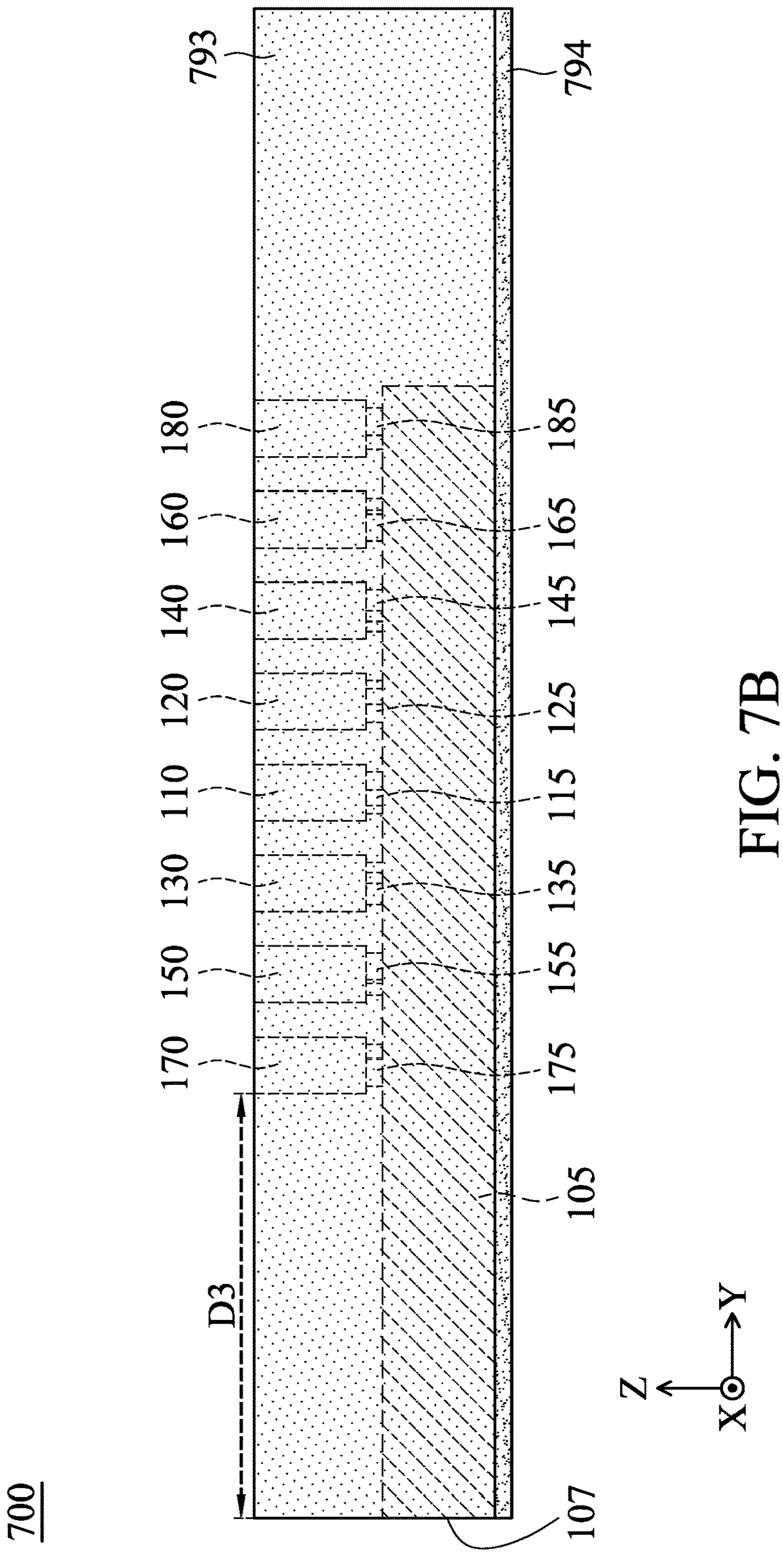
FIG. 7B is a side view of the antenna structure according to an embodiment of the invention.

FIG. 7A is an exploded view of an antenna structure 700 according to an embodiment of the invention. FIG. 7B is a side view of the antenna structure 700 according to an embodiment of the invention. Please refer to FIG. 7A and FIG. 7B together. FIG. 7A and FIG. 7B are similar to FIG.

4. In the embodiment of FIG. 7A and FIG. 7B, the antenna structure 700 further includes an integrated metal layer 793 and a ground metal layer 794. The ground metal layer 794 is attached to the ground metal layer 794. The input waveguide 105, the first output waveguide 110, the second output waveguide 120, the third output waveguide 130, the fourth output waveguide 140, the fifth output waveguide 150, the sixth output waveguide 160, the seventh output waveguide 170, the eighth output waveguide 180, the first Z-shaped slot 115, the second Z-shaped slot 125, the third Z-shaped slot 135, the fourth Z-shaped slot 145, the fifth Z-shaped slot 155, the sixth Z-shaped slot 165, the seventh Z-shaped slot 175, and the eighth Z-shaped slot 185 are all formed in the integrated metal layer 793. To improve the whole impedance matching, the distance D3 between the input end 107 of the input waveguide 105 and the seventh output waveguide 170 may be at least 0.5 effective wavelength ($\lambda g/2$) of the operational frequency band FB1 of the antenna structure 700. Under the $TE_{10}$ mode, the effective wavelength ($\lambda g$) may be about 5 mm. Because the manufacturing process of the integrated metal layer 793 and the ground metal layer 794 are relatively mature, the design of the antenna structure 700 can help to reduce the difficulty of the whole manufacturing process. Other features of the antenna structure 700 of FIG. 7A and FIG. 7B are similar to those of the antenna structure 400 of FIG. 4. Therefore, the two embodiments can achieve similar levels of performance.

The invention proposes a novel antenna structure. In comparison to the conventional design, the invention has advantages of high cross-polarization isolation, small size, wide bandwidth, and low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-7. The invention may merely include any one or more features of any one or more embodiments of FIGS. 1-7. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

an input waveguide;

a first output waveguide, wherein the first output waveguide is connected through a first Z-shaped slot to the input waveguide;

a second output waveguide, disposed adjacent to the first output waveguide, wherein the second output waveguide is connected through a second Z-shaped slot to the input waveguide;

a third output waveguide, disposed adjacent to the first output waveguide, wherein the third output waveguide is connected through a third Z-shaped slot to the input waveguide; and a fourth output waveguide, disposed adjacent to the second output waveguide, wherein the fourth output waveguide is connected through a fourth Z-shaped slot to the input waveguide;

wherein the second Z-shaped slot is symmetrical to the first Z-shaped slot, such that the second Z-shaped slot is considered as a mirror image of the first Z-shaped slot;

wherein the fourth Z-shaped slot is symmetrical to the third Z-shaped slot, such that the fourth Z-shaped slot is considered as a mirror image of the third Z-shaped slot;

wherein each of the first Z-shaped slot and the second Z-shaped slot has a first tilt angle;

wherein each of the third Z-shaped slot and the fourth Z-shaped slot has a second tilt angle, and the second tilt angle is smaller than the first tilt angle.

2. The antenna structure as claimed in claim 1, wherein the antenna structure covers an operational frequency band from 73 GHz to 78 GHz.

3. The antenna structure as claimed in claim 2, wherein a length of each of the first Z-shaped slot and the second Z-shaped slot is equal to 0.5 wavelength of the operational frequency band.

4. The antenna structure as claimed in claim 2, wherein a center-to-center distance between the first output waveguide and the second output waveguide is equal to 0.5 wavelength of the operational frequency band.

5. The antenna structure as claimed in claim 1, wherein the first Z-shaped slot is formed on the input waveguide, the first output waveguide, or a combination thereof.

6. The antenna structure as claimed in claim 1, wherein the second Z-shaped slot is formed on the input waveguide, the second output waveguide, or a combination thereof.

7. The antenna structure as claimed in claim 1, further comprising:

a first metal layer, wherein the input waveguide is formed in the first metal layer; and a second metal layer, attached to the first metal layer, wherein the first output waveguide and the second output waveguide are formed in the second metal layer.

8. The antenna structure as claimed in claim 1, further comprising:

an integrated metal layer, wherein the input waveguide, the first output waveguide, and the second output waveguide are formed in the integrated metal layer; and a ground metal layer, attached to the integrated metal layer.

9. The antenna structure as claimed in claim 1, wherein the first output waveguide further comprises a first protruding portion and a second protruding portion opposite to each other, and the first Z-shaped slot is positioned between the first protruding portion and the second protruding portion.

10. The antenna structure as claimed in claim 1, wherein the second output waveguide further comprises a third protruding portion and a fourth protruding portion opposite to each other, and the second Z-shaped slot is positioned between the third protruding portion and the fourth protruding portion.

11. The antenna structure as claimed in claim 1, wherein the first Z-shaped slot, the second Z-shaped slot, the third Z-shaped slot, and the fourth Z-shaped slot are all arranged along the input waveguide.

12. The antenna structure as claimed in claim 1, wherein the first tilt angle and the second tilt angle are designed according to Chebyshev distribution.

13. The antenna structure as claimed in claim 1, wherein the first tilt angle is substantially equal to 20.8 degrees.

14. The antenna structure as claimed in claim 1, wherein the second tilt angle is substantially equal to 15.3 degrees.

15. The antenna structure as claimed in claim 1, further comprising:

a fifth output waveguide, disposed adjacent to the third output waveguide, wherein the fifth output waveguide is connected through a fifth Z-shaped slot to the input waveguide.

16. The antenna structure as claimed in claim 15, further comprising:

a sixth output waveguide, disposed adjacent to the fourth output waveguide, wherein the sixth output waveguide is connected through a sixth Z-shaped slot to the input waveguide.

17. The antenna structure as claimed in claim 16, wherein each of the fifth Z-shaped slot and the sixth Z-shaped slot has a third tilt angle, and the third tilt angle is smaller than the second tilt angle.

18. The antenna structure as claimed in claim 17, further comprising:

a seventh output waveguide, disposed adjacent to the fifth output waveguide, wherein the seventh output waveguide is connected through a seventh Z-shaped slot to the input waveguide.

19. The antenna structure as claimed in claim 18, further comprising:

an eighth output waveguide, disposed adjacent to the sixth output waveguide, wherein the eighth output waveguide is connected through an eighth Z-shaped slot to the input waveguide.

20. The antenna structure as claimed in claim 19, wherein each of the seventh Z-shaped slot and the eighth Z-shaped slot has a fourth tilt angle, and the fourth tilt angle is smaller than the third tilt angle.

* * * * *